(12) United States Patent
Winkle et al.

(10) Patent No.: US 10,661,311 B2
(45) Date of Patent: May 26, 2020

(54) AUTOMATED TOTE ROUTING SYSTEM AND METHODS

(71) Applicant: Walmart Apollo, LLC, Bentonville, AR (US)

(72) Inventors: David Winkle, Bella Vista, AR (US); Bruce W. Wilkinson, Rogers, AR (US); Todd Davenport Mattingly, Bentonville, AR (US); Luke Matthew Reynolds, Dallas, TX (US); Michael Dean Atchley, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/683,949

(22) Filed: Aug. 23, 2017

(65) Prior Publication Data
US 2018/0065156 A1  Mar. 8, 2018

Related U.S. Application Data

(60) Provisional application No. 62/384,856, filed on Sep. 8, 2016.

(51) Int. Cl.
*B07C 5/34* (2006.01)
*G06Q 10/06* (2012.01)
(Continued)

(52) U.S. Cl.
CPC ............ *B07C 5/3412* (2013.01); *B07C 5/342* (2013.01); *B65G 1/1371* (2013.01); *G06Q 10/06* (2013.01); *B07C 5/34* (2013.01); *G06Q 50/28* (2013.01)

(58) Field of Classification Search
CPC ......... B07C 5/34; B07C 5/3412; B07C 5/342; B07C 5/3422; B65G 1/1371; G06Q 50/28
See application file for complete search history.

(56) References Cited

U.S. PATENT DOCUMENTS 6,190,110 B1  2/2001  Stanley et al.
6,323,452 B1  11/2001  Bonnet
(Continued)

OTHER PUBLICATIONS

International Search Report and Written Opinion issued in related International Patent Application No. PCT/Us2017/048122 dated Oct. 31, 2017.

(Continued)

*Primary Examiner* — Charles A Fox
*Assistant Examiner* — Kalyanavenkateshware Kumar
(74) *Attorney, Agent, or Firm* — McCarter & English, LLP; David R. Burns

(57) ABSTRACT

An automated tote routing systems that includes a conveyer belt, an array of sensors underneath the conveyer belt, and an identifier reader disposed with respect to the conveyer belt is discussed. The conveyer belt can be configured to receive a tote filled with physical objects. The array of sensors can detect a first set of attributes associated with the physical objects within the tote. The identifier reader can read and decode an identifier from a machine-readable element disposed on the tote. The array of sensors and identifier reader can transmit the first set of attributes and the identifier to a computing system. Based on the set of information associated with the physical objects and the set of attributes associated with the physical objects, a routing module executed by the computing system can automatically trigger the conveyer belt to route the tote to a selected distribution end of the conveyor belt.

20 Claims, 8 Drawing Sheets

(51) Int. Cl.
*B07C 5/342* (2006.01)
*B65G 1/137* (2006.01)
*G06Q 50/28* (2012.01)

(56) References Cited

U.S. PATENT DOCUMENTS

| | | | |
|---|---|---|---|
| 7,118,034 B2 | 10/2006 | Baldassari et al. | |
| 7,278,568 B2 * | 10/2007 | Kadaba | B07C 3/008 |
| | | | 235/375 |
| 7,347,361 B2 | 3/2008 | Lovett | |
| 7,543,741 B2 | 6/2009 | Lovett | |
| 7,810,720 B2 | 10/2010 | Lovett | |
| 9,550,577 B1 | 1/2017 | Beckman et al. | |
| 9,573,684 B2 | 2/2017 | Kimchi et al. | |
| 2003/0116484 A1 | 6/2003 | Takizawa | |
| 2007/0012602 A1 | 1/2007 | Baldassari et al. | |
| 2015/0057793 A1 | 2/2015 | Kawano | |
| 2015/0120094 A1 | 4/2015 | Kimchi et al. | |
| 2015/0277440 A1 | 10/2015 | Kimchi et al. | |
| 2015/0360877 A1 | 12/2015 | Shin | |
| 2016/0039611 A1 | 2/2016 | Hoynash et al. | |
| 2016/0196755 A1 | 7/2016 | Navot et al. | |
| 2016/0257401 A1 | 9/2016 | Buchmueller et al. | |
| 2017/0110017 A1 | 4/2017 | Kimchi et al. | |

OTHER PUBLICATIONS

VITRONIC—VIPAC—Camera-based data capture for Parcel Logistics and Warehouse & Distribution, VITRONIC—VIPAC—Camera-based data capture for Parcel Logistics and Warehouse & Distribution <https://www.youtube.com/watch?v=M8DX_fKP_-4>, Mar. 22, 2012.

Viscon Logistics—Sorting Systems, https://www.youtube.com/watch?v=O00gDoGXN98, Published Sep. 18, 2014.

Invata Intralogistics—Warehouse Automation Overview, https://www.youtube.com/watch?v=amwnsWEcgdk, Published Jun. 29, 2015.

* cited by examiner

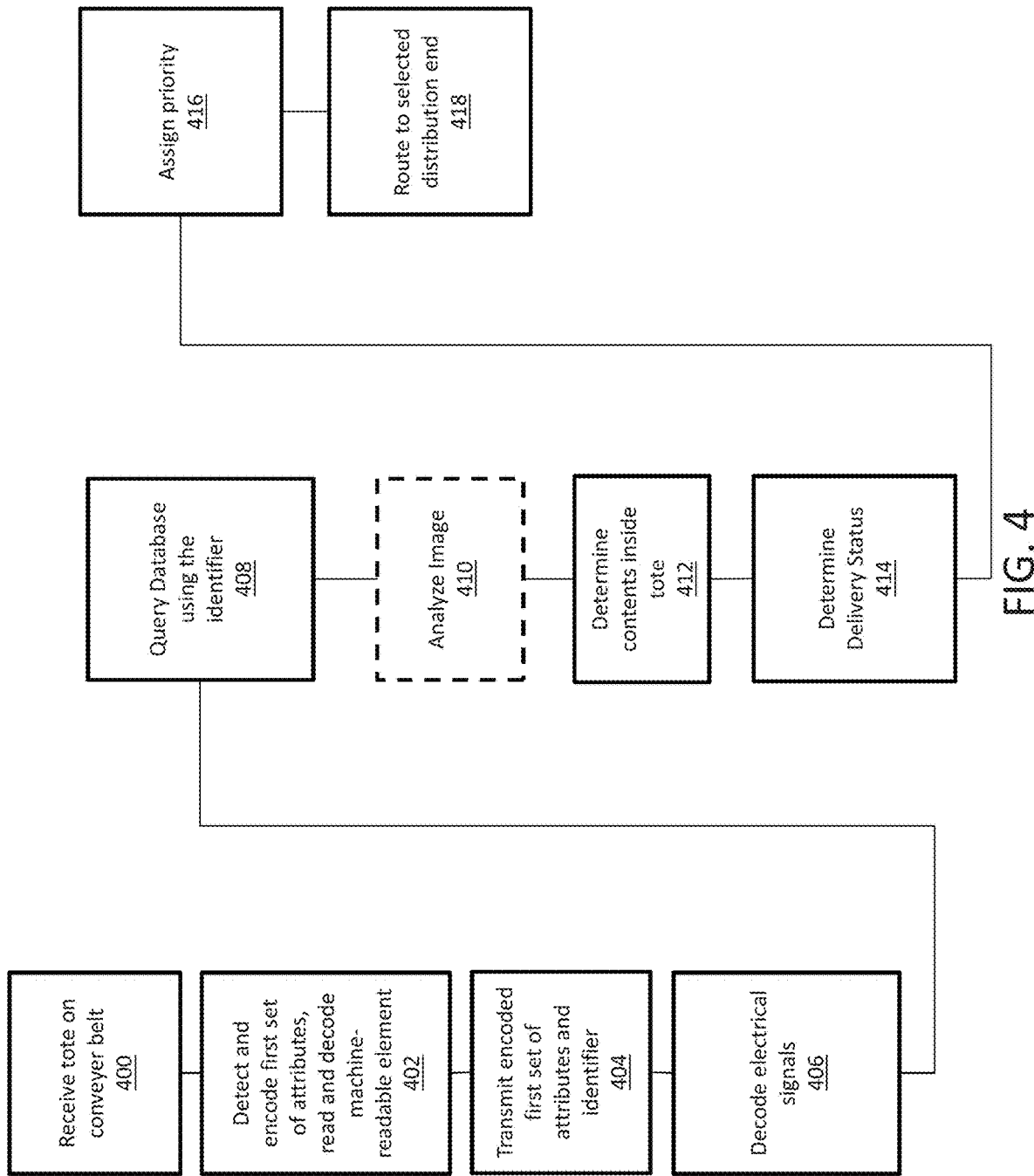

AUTOMATED TOTE ROUTING SYSTEM AND METHODS

CROSS-REFERENCE TO RELATED PATENT APPLICATIONS

This application claims priority to U.S. Provisional Application No. 62/384,856 filed on Sep. 8, 2016, the content of which is hereby incorporated by reference in its entirety.

BACKGROUND

Distribution facilities are required to route products passing through the facility in an accurate and efficient manner. The products frequently have different destinations and different delivery requirements. The individual products being shipped may be placed into containers or totes that traverse the length of the facility with the aid of one or more interlocking conveyor belts. It can be difficult to route totes efficiently through the facility for subsequent loading for travel to a final product destination.

SUMMARY

In one embodiment an autonomous routing system includes a conveyer belt, one or more sensors beneath the conveyor belt, an identifier reader disposed with respect to the conveyor belt and a computing system including a server and a database operatively coupled to the one or more sensors and the identifier reader. The conveyor belt includes multiple distribution ends and is configured to receive a first tote on the conveyor belt and transport the first tote to one of the distribution ends. Multiple physical objects are stored in the first tote. The one or more sensors are configured to detect a first set of attributes associated with the physical objects stored in the first tote in response to the first tote passing over at least one of the one or more sensors. The identifier reader is configured to read a machine-readable element associated with the physical objects stored in the first tote and decode the machine-readable element to extract the identifier. The computing system is configured to execute a routing module. The routing module when executed queries the database using the identifier extracted from the machine-readable element by the identifier reader to retrieve information associated with the physical objects stored in the first tote and automatically triggers the conveyer belt to route the first tote to a selected one of the distribution ends based on the first set of attributes and the retrieved information associated with the physical objects stored in the first tote.

In another embodiment, an autonomous routing method includes receiving, on a conveyer belt that includes multiple distribution ends, a first tote, and transporting, via the conveyer belt, the first tote to one of the distribution ends. Multiple physical objects are stored in the first tote. The method also includes detecting, via one or more sensors disposed beneath the conveyer belt, a first set of attributes associated with the physical objects stored in the first tote in response to the first tote passing over at least one of the one or more sensors. Additionally, the method also includes reading, via an identifier reader disposed with respect to the conveyer belt, a machine-readable element associated with the physical objects stored in the first tote and decoding, via the identifier reader, an identifier encoded in the machine-readable element. The method further includes querying, via a computing system including a server and a database operatively coupled to the one or more sensors and the identifier reader, the database using the identifier extracted from the machine-readable element by the identifier reader to retrieve information associated with the physical objects stored in the first tote. The method also automatically triggers, via the computing system, the conveyer belt to route the first tote to a selected one of the distribution ends based on the first set of attributes and the retrieved information associated with the physical objects stored in the first tote.

BRIEF DESCRIPTION OF THE FIGURES

Illustrative embodiments are shown by way of example in the accompanying figures and should not be considered as a limitation of the present disclosure. The accompanying figures, which are incorporated in and constitute a part of this specification, illustrate one or more embodiments of the invention and, together with the description, help to explain the invention. In the figures:

FIG. 4 is a flowchart illustrating an exemplary process in accordance with an exemplary embodiment.

DETAILED DESCRIPTION

Figure 1A:
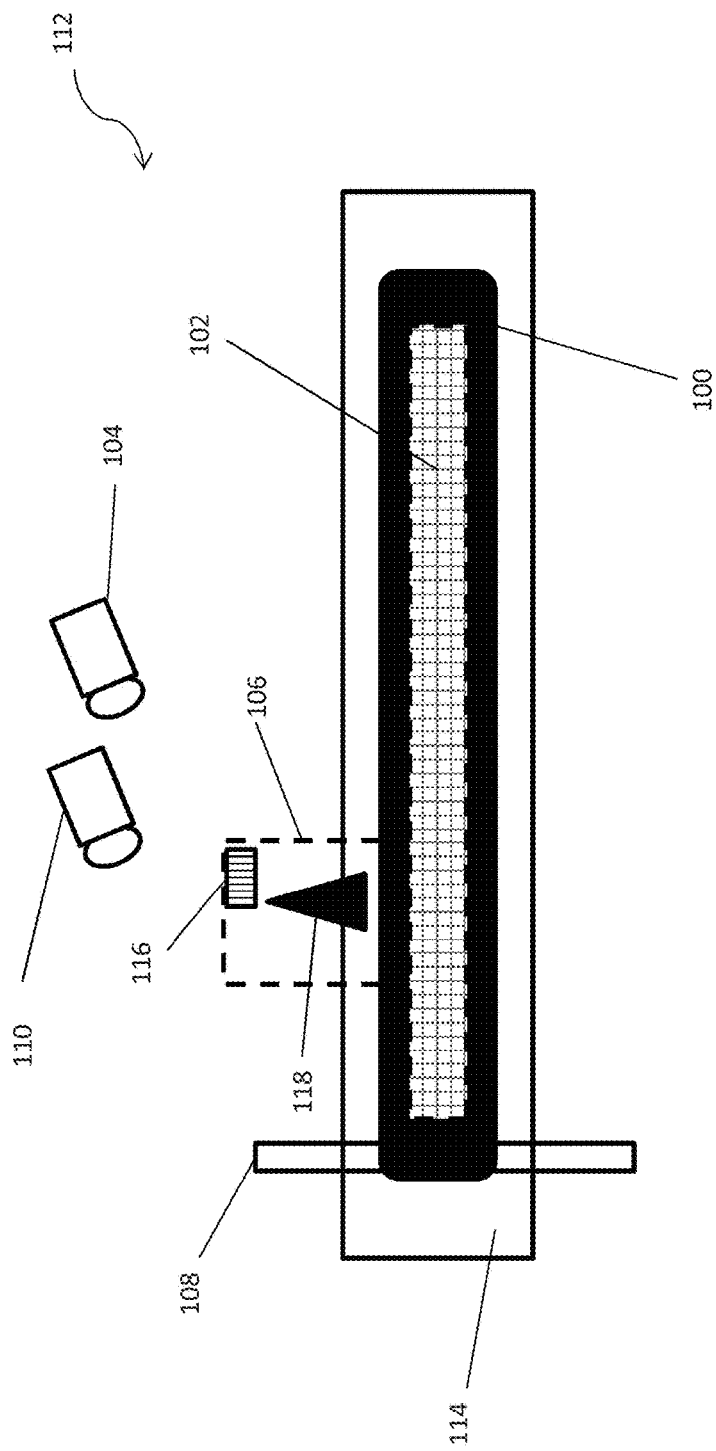
FIG. 1A is a block diagram of a conveyer belt embedded with sensors in accordance with an exemplary embodiment.

Described in detail herein are automated tote routing systems and methods. In exemplary embodiments, the automated tote routing system can include a conveyer belt disposed in a facility, an array of sensors underneath the conveyer belt, and an identifier reader disposed with respect to the conveyer belt. The automated tote routing system can automatically route totes filled with physical objects, disposed on conveyer belts to particular distribution ends. The automated tote routing system can prioritize the totes and manage error handling, such as unexpected physical objects within totes, damaged totes and damaged physical objects.

In one embodiment, current status attributes of physical objects within the tote detected by the sensors underneath the conveyor belt or in the tote are used in combination with product information associated with a product identifier to determine a routing destination for the tote. For example, the sensors may be used to detect current attributes such as weight, pressure, temperature, and moisture attributes of the products in the tote and a routing module may use such information in combination with information associated with a detected product identifier to determine the tote destination.

In some embodiments, the identifier can be missing or not present on the tote. The sensors can detect attributes associated with physical objects in the tote, and query the database using the attributes to retrieve another set of attributes associated with the physical objects. In response to retrieving the set of attributes from the database, the tote can be routed on the conveyer belt to a particular distribution end.

The conveyer belt can be configured to receive a tote filled with physical objects. An array of sensors can detect a first set of attributes associated with the physical objects within the tote as the tote passes by the sensors. The sensors can be embedded in the conveyer belt or within the base of the tote. An identifier reader, such as but not limited to a scanner or RFID reader, can read and decode an identifier from a machine-readable element disposed on the tote as the tote passes by the identifier reader. The array of sensors and the identifier reader can transmit the first set of attributes and the identifier to a computing system operatively coupled to the array of sensors and the identifier reader. The computing system can receive the first set of attributes and identifier. A routing module being executed on the computing system can query a database using the identifier to receive a set of information associated with the physical objects stored in the tote. Based on the set of information associated with the physical objects and the detected first set of attributes associated with the physical objects, the computing system can automatically trigger the conveyer belt to route the tote to a selected distribution end. For example, one distribution end may be dedicated to totes with frozen products, another distribution end may be dedicated to totes with refrigerated products, a different distribution end may be configured to accept totes with products at ambient room temperatures and another distribution end may be a quality control distribution end configured to accept totes with products with which the sensors have detected some problem. Alternatively, the routing module executed by the computing system can route the tote based solely on the state of the physical objects within the tote. The computing system can determine the state of the physical objects based on the attributes detected by the sensors. For example, the computing system can determine that the physical objects within the tote need to be routed to the freezer distribution end based on the attributes (e.g. temperature) of the physical objects. In some embodiments, the computing system can assign a priority to the tote based on the first set of attributes and the set of information associated with the physical objects. For example, the priority may be assigned based on a time the tote arrived, a determined weight and/or if a determined weight does not match an expected weight of the tote. In some embodiments, the physical objects within the tote can be identified as damaged by the sensors and can be routed to a specific distribution end which handles damaged physical objects and totes.

In some embodiments, the system can include an image capturing device disposed with respect to the conveyer belt. The image capturing device can capture an image of the physical objects stored in the tote and transfer the image to the computing system. In another embodiment, the image capturing device can capture an image of the physical objects outside the tote and transfer the image to the computing system. The computing system can extract a second set of attributes associated with the physical objects stored in the tote and automatically trigger the conveyer belt to route the tote to a selected distribution end based at least partly on the second set of attributes associated with the physical objects stored in the tote.

FIG. 1A is a block diagram of a conveyer belt with sensors in accordance with exemplary embodiments of the present disclosure. A conveyer belt 100 can be disposed in a facility 112 and an array of sensors 102 can be disposed underneath the conveyer belt 100. The facility 112 may be a distribution facility such as a warehouse or store, and the conveyor belt 100 may be for the purpose of shipping (outbound) or receiving (inbound) objects An identifier reader 104 can be disposed with respect to the conveyer belt 100. In some embodiments, the identifier reader 104 can be disposed above the conveyer belt 100. In other embodiments, the identifier reader 104 can be disposed within a tunnel 108. In another embodiment, the identifier reader may be located on a wall of the facility, preferably adjacent to the conveyor belt. The tunnel can also be disposed around a first end 114 of the conveyer belt. In some embodiments, an image capturing device 110 may also be disposed with respect to the conveyor belt to capture images of products in the tote as the tote traverses the conveyor belt.

The conveyer belt 100 can be configured to receive a tote 106 at the first end 114 of the conveyer belt 100. Physical objects 118 can be stored in the tote 106. The tote 106 can pass through the tunnel 108 at the first end 114 of the conveyer belt 100. In response to passing through the tunnel 108, the identifier reader can read a machine readable element 116 disposed on the tote. The identifier reader 104 can be, but is not limited to, an optical scanner or an RFID reader. The machine-readable element 116 can be, but is not limited to, a barcode, QR code, an RFID tag, or a machine-readable element detectable by a Near Field Communication (NFC) device. In embodiments including an image capturing device 110, the image capturing device can capture still or moving images. The machine-readable element 116 can be encoded with an identifier associated with the physical objects 118 disposed inside the tote 106. The identifier reader 104 can transmit the decoded identifier to the computing system.

It should be understood that the above-described tunnel is described for the purpose of illustration and that the tunnel is an optional part of the tote routing system described herein. For example, the image capturing device 110 and the identifier reader 104 can be disposed above the conveyer belt 100 on a wall or ceiling instead of in the tunnel. The image capturing device 110 can capture an image of the physical objects 118 inside the tote and the identifier reader can read the machine readable element as the tote 106 is transported on the conveyer belt 100.

The array of sensors can be formed of piezoelectric material. A piezoelectric material is a material that uses the piezoelectric effect, to measure changes in pressure, acceleration, temperature, strain or force by converting them to an electrical charge. Accordingly, the array of sensors 102 can detect a first set of attributes such as weight, pressure, temperature, and/or moisture of the physical objects 118 inside the tote 106. The array of sensors 102 can encode the first set of attributes into electrical signals. The array of sensors 102 can transmit the electrical signals to the computing system.

Figure 1B:
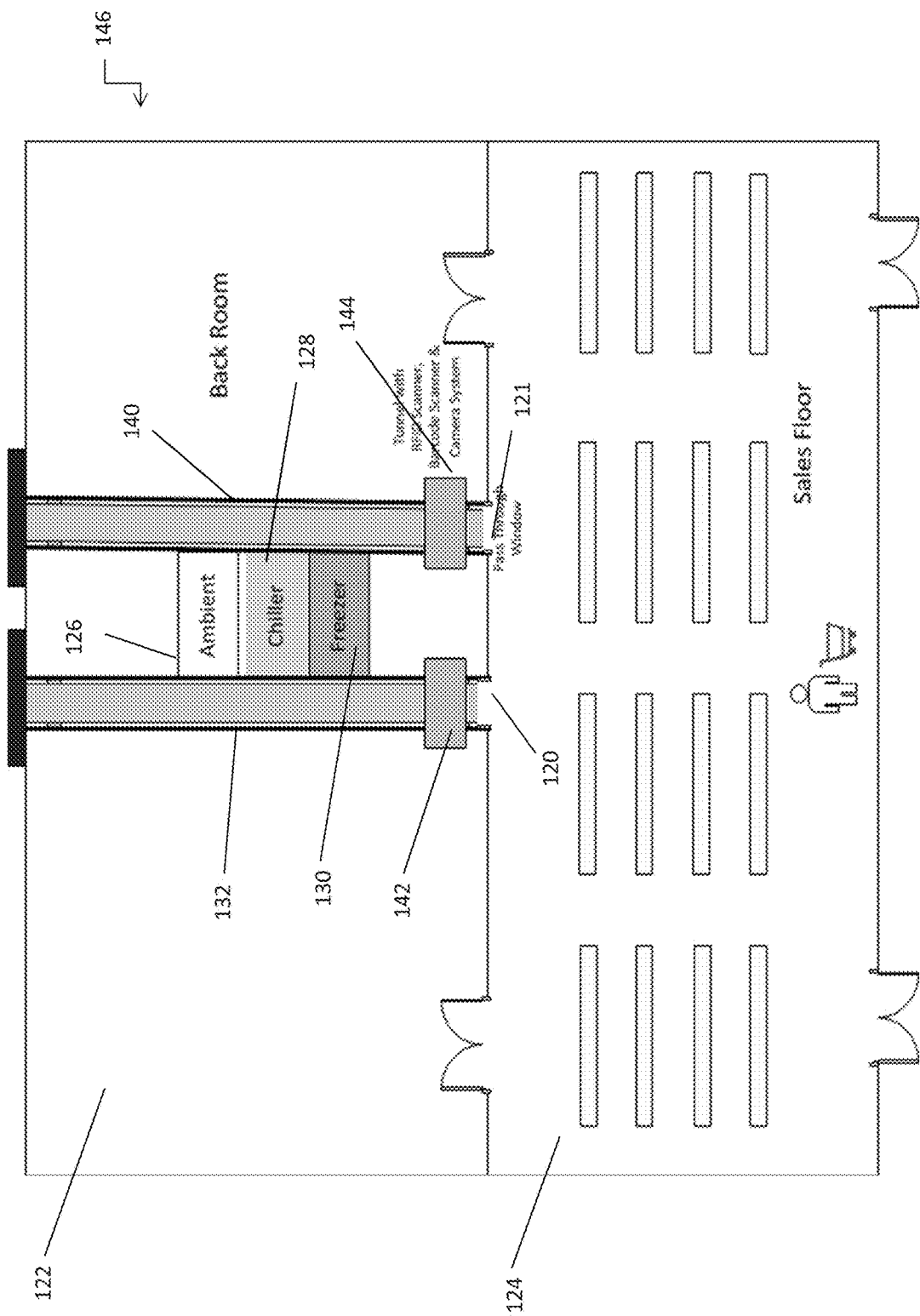
FIG. 1B is a block diagram of a conveyer belt in a back room of a facility in accordance with an exemplary embodiment.

FIG. 1B is a block diagram of a conveyer belt in a back room of a facility in accordance with an exemplary embodiment. The conveyer belts 132 and 140 can be disposed in a back room 122 of a facility 146. The back room 122 can be adjacent to a front room 124 and physical objects can be disposed in the front room 124. An array of sensors (not shown) can be disposed underneath the conveyer belts 132 and 140. Tunnels 142 and 144 can be disposed over the conveyer belt 132 and 140 respectively. Image capturing devices (not shown) and identifier readers (not shown) can be disposed within the tunnels 142 and 144. A freezer distribution end 130, a refrigeration distribution end 128 and an ambient distribution end 126 can be disposed adjacent to the conveyer belts 132 and 140. It should be appreciated that other types of distribution ends such as, but not limited to, a quality control end (described further below) or geographic destination-specific distribution ends are also within the scope of the present invention. It should be further appreciated that although the term "distribution end" is used throughout this description, the "end" refers to a terminus of the tote's trip on the conveyor belt and not necessarily the literal end of the conveyor belt. The freezer distribution end 130 can be a storage unit of the facility configured to store totes in freezing temperature. The refrigeration distribution end 128 can be a storage unit in the facility configured to store totes in refrigerated temperatures. The ambient distribution end 126 can be a storage unit in the facility configured to store totes at room temperature. In exemplary embodiments, totes can be received by the conveyer belts 132 and 140 through the pass through windows 120 and 121. The identifier reader within the tunnels 142 and 144 can read a machine-readable element. If the tote routing system is equipped with an image capturing device, the image capturing device can capture still or video images of the products within the totes as the products pass by the image capturing device. The array of sensors can detect a first set of attributes associated with the physical objects inside the tote as the totes pass over the array of sensors. For example, the attributes detected by the sensors may indicate, but are not limited to indicating, a temperature, pressure, weight and/or moisture of the products in the tote, As described further herein, the detected attributes and data associated with the machine readable element are used to determine where to automatically route the totes (i.e. to determine to which distribution end the totes should be sent).

Figure 1C:
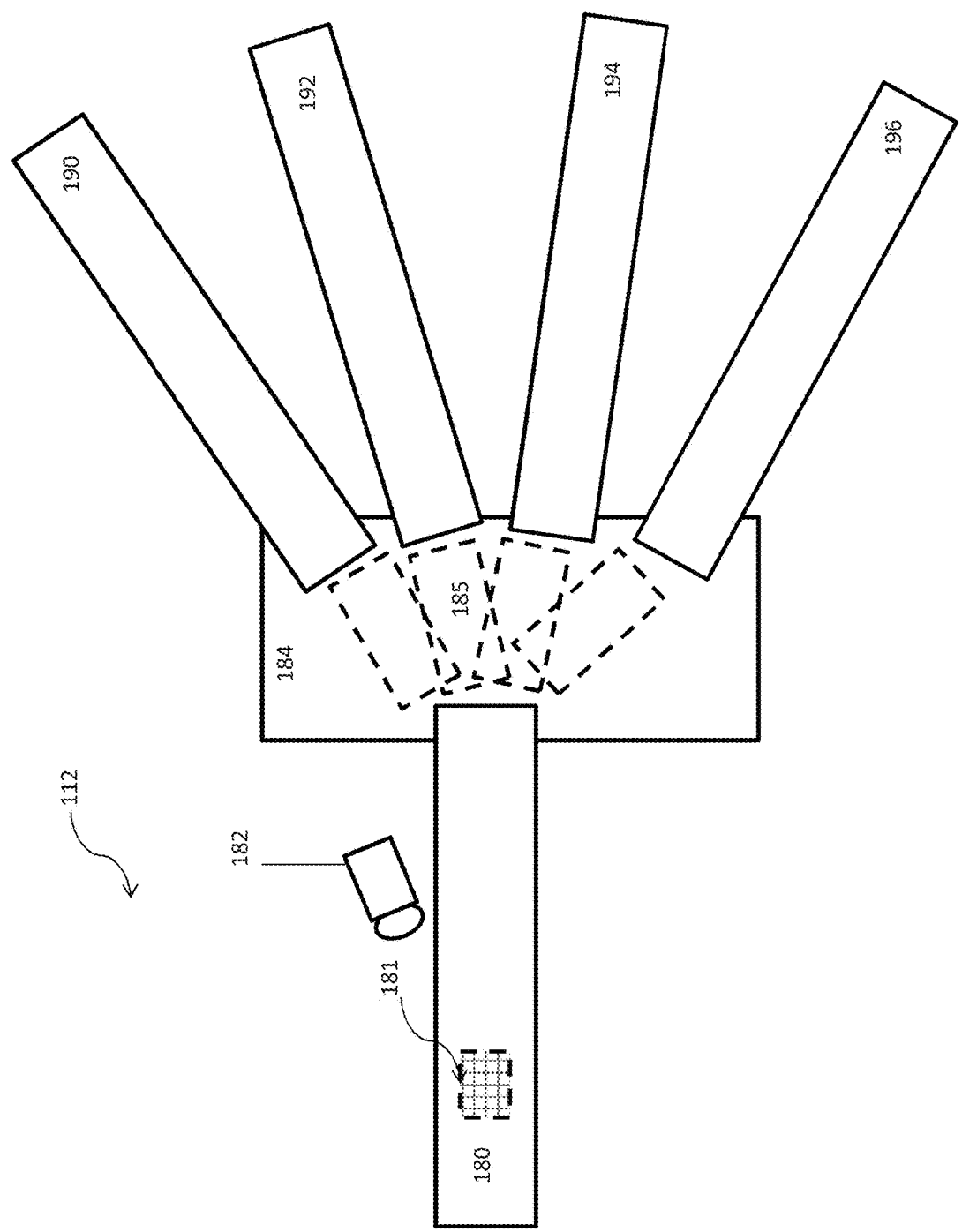
FIG. 1C is a block diagram of an alternative conveyor belt arrangement in an embodiment.

It should be appreciated that alternative configurations of the conveyor belt in the facility other than those depicted in FIG. 1A and FIG. 1B are also within the scope of the present invention. For example, FIG. 1C is a block diagram of an alternative conveyor belt arrangement in an embodiment. As shown in FIG. 1C, a tote may be placed at the end of a first conveyor belt 180 to traverse to a collection area 184. The tote traverses sensors 181 and has an identifier read by identifier reader 182. A shunting mechanism 185 which may be a physical barrier redirecting the tote, a movable conveyor belt or some other type of directing mechanism that is controllable by the routing module operates to direct the tote onto a designated belt for conveyance to a desired distribution end. For example, conveyor belt 190 may lead to a distribution end for products requiring freezing, conveyor belt 192 may lead to a distribution end for products requiring refrigeration, conveyor belt 194 may lead to a distribution end for products requiring ambient room temperature and conveyor belt 196 may lead to a quality control distribution end 196 where products whose detected attributes are questionable are sent. For example, moisture may be detected where no moisture is expected in a tote or the tote may register at room temperature when the read label indicates it contains frozen food product (thereby indicating a potential health hazard). It will be appreciated that other belt configurations consistent with the principals described herein are also within the scope of the present invention.

Figure 1D:
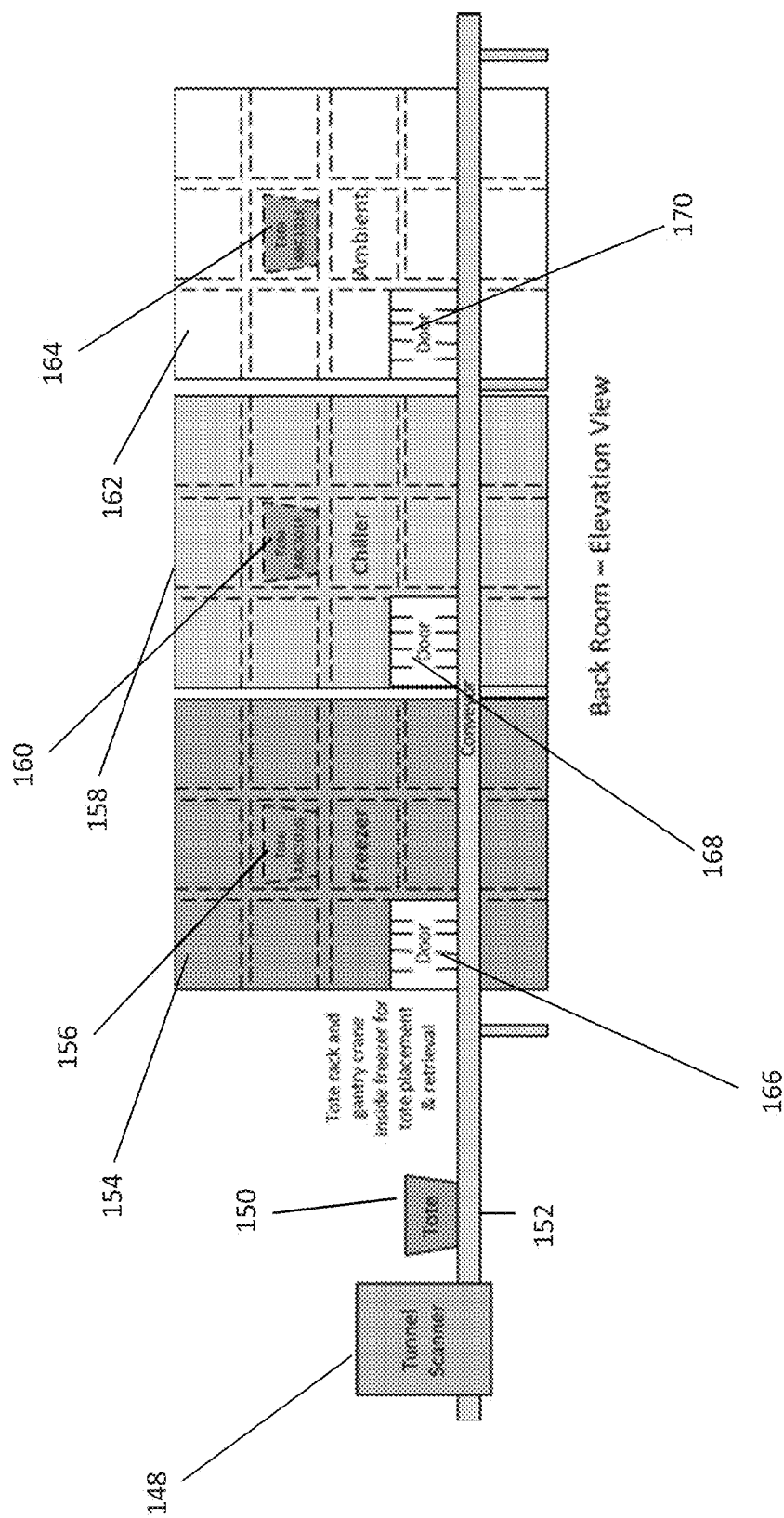
FIG. 1D is a block diagram of a conveyer belt routing totes in a facility in accordance with an exemplary embodiment.

FIG. 1D is a block diagram of a conveyer belt routing totes in a facility in accordance with an exemplary embodiment. As mentioned above a conveyer belt 152 can be disposed in a facility 169. A tunnel scanner 148 operating as the identifier reader can be disposed over the conveyer belt 152. An image capturing device (not shown) and an identifier reader (not shown) can be disposed inside the tunnel scanner 148. An array of sensors (not shown) can be disposed underneath the conveyor belt 152. The conveyor belt 152 can be adjacent to a freezer distribution end 154, a chiller distribution end 158, and an ambient distribution end 162. The freezer, chiller and ambient distribution ends 158-162 can be storage units disposed in the facility with varying temperatures, configured to store totes. For example, the tote 156 can be stored in the freezer distribution end 154, the tote 160 can be stored in the chiller distribution end 158 and the tote 164 can be stored in the ambient distribution end 162.

In exemplary embodiments, the tote 150 filled with physical objects can be received by the conveyor belt at a first end. The tote 150 can travel through the tunnel scanner 148 in which a machine readable element on the tote can be read and an identifier associated with the physical objects within the tote can be decoded from the machine readable element by the identifier reader. It should be appreciated that the identifier reader may read the identifier and send the identifier to another device for decoding without departing from the scope of the present invention. Furthermore, the array of sensors can detect a first set of attributes associated with the physical objects within the tote. Based on consideration of the identifier, and the first set of attributes detected by the sensors (and optionally data from an image of the physical objects within the tote 150 captured by the image capturing device) a routing module executed by a computing device can route the tote 150 to the freezer distribution end 154, the chiller distribution end 158 or the ambient distribution end 162. The tote 150 can enter the distribution ends 154,158 and 162 through the doors 166, 168 and 170. The operation of the routing module is described further below.

Figure 1E:
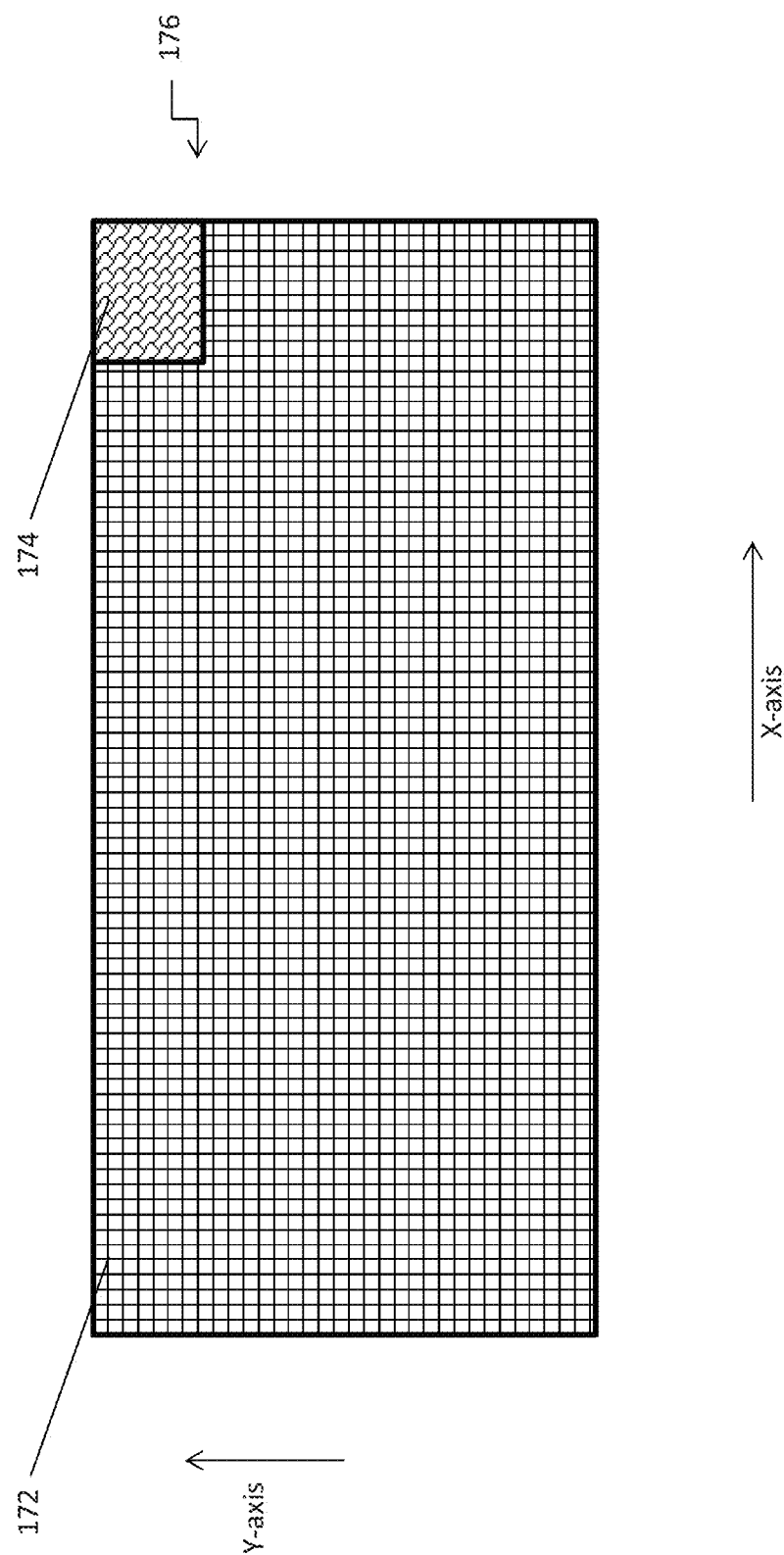
FIG. 1E illustrates an array of sensors in accordance with an exemplary embodiment.

FIG. 1E illustrates an array of sensors in accordance with an exemplary embodiment. As discussed above an array of sensors 176 can be disposed underneath the conveyer belt. The array of sensors 176 may be arranged as multiple individual sensor strips 172 extending along the conveyor belt defining a sensing grid or matrix. The array of sensors 176 can be built into the conveyer belt itself or may be incorporated into a liner or mat disposed underneath the conveyer belt. Although the array of sensors 176 is shown as arranged to form a grid, the array of sensors can be disposed in other various ways. For example, the array of sensors 176 may also be in the form of lengthy rectangular sensor strips extending along either the x-axis or y-axis. The array of sensors 176 can detect attributes associated with the physical objects that are traveling along the conveyor belt, such as, for example, detecting pressure or weight indicating the presence or absence of merchandise at each individual sensor 172. In some embodiments, the surface of the conveyer belt is covered with an appropriate array of sensors 176 with sufficient discrimination and resolution so that, in combination, the sensors 172 are able to identify the quantity, and in some cases, the type of physical objects in the tote.

In some embodiments the array of sensors 176 can be disposed along a bottom surface of a tote and can be configured to detect and sense various characteristics associated with the physical objects stored within the tote. The array of sensors can be built into the bottom surface of the tote or can be incorporated into a liner or mat disposed at the bottom surface of the mat.

The array of sensors 176 may be formed of piezoelectric material. Piezoelectric sensors are sensors that can measure various characteristics, including pressure, force, and temperature. Piezoelectric sensors are one suitable sensor type, it should be appreciated that many other sensor types may also be used, such as, for example, other types of pressure/weight sensors (load cells, strain gauges, etc.).

Figure 2:
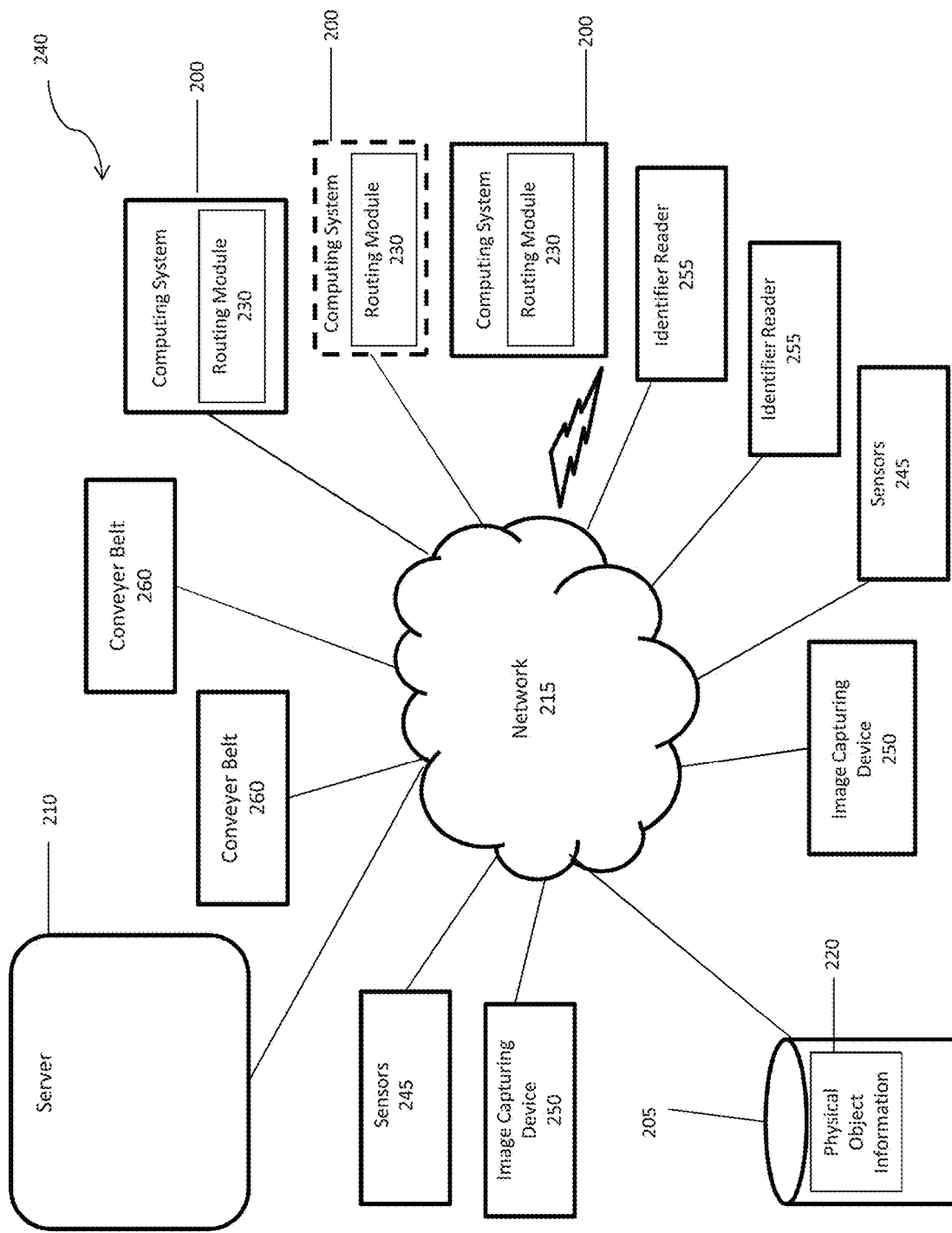
FIG. 2 is a block diagrams illustrating an automated tote routing system according to an exemplary embodiment.

FIG. 2 illustrates an exemplary automated tote routing system in accordance with an exemplary embodiment. The automated tote routing system 250 can include one or more databases 205, one or more servers 210, one or more computing systems 200, multiple instances of the sensors 245, image capturing devices 250, identifier readers 255 and conveyer belts 260. The sensors 245 can be an array of sensors disposed underneath a conveyer belt. Alternatively, the sensors 245 can be an array of sensors disposed at a bottom surface of a tote, adjacent to the conveyor belt or in another location from which the sensors can detect attributes of the products in the tote. In exemplary embodiments, the computing system 200 can be in communication with the databases 205, the server(s) 210, multiple instances of the sensors 245, image capturing devices 250, identifier readers 255 and conveyer belts 260, via a communications network 215. The computing system 200 can implement at least one instance of the routing module 230.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the computing system 200 and the databases 205, via the network 215. The server 210 hosts one or more applications configured to interact with one or more components computing system 200 and/or facilitates access to the content of the databases 205. In some embodiments, the server 210 can host the routing module 230 or portions thereof. The databases 205 may store information/data, as described herein. For example, the databases 205 can include physical objects database 220. The physical objects database 220 can store information associated with physical objects disposed at a facility and can be indexed via the decoded identifier retrieved by the identifier reader. The databases 205 and server 210 can be located at one or more geographically distributed locations from each other or from the computing system 200. Alternatively, the databases 205 can be included within server 210.

In exemplary embodiments, the computing system 200 can receive a first set of attributes associated with the physical objects encoded in electrical signals from the sensors 245 and an identifier associated with the physical objects from the identifier reader 255. The computing system 200 can execute the routing module 230 in response to receiving the first set of attributes and the identifier. The routing module 230 can decode the first set of attributes associated with the physical objects from the electrical signals. The routing module 230 can query the physical objects database 220 using the identifier to retrieve data associated with the physical objects in the tote. The routing module 230 can control the conveyer belt 260 to route the tote to a distribution end based on at least one of the first set of attributes and the set of information retrieved from the physical objects database. In one embodiment, the data retrieved by the routing module and used in making its routing decision may include expected attribute values for products in the totes such as an expected temperature or expected moisture level. For example, the detected first set of attributes indicating a cooler but not frozen temperature in the tote may be used by the routing module as a quality control check to make sure that refrigerated products identified by the identifier are in fact registering as cold before routing them to a refrigerated distribution end. Further, in one example, if a temperature of objects detected by the sensors is approaching a threshold value (e.g. the product may be in danger of becoming too warm), the tote may be prioritized for transfer to a distribution end (e.g. refrigerated or frozen distribution end) to address the detected risk. As a non-limiting example, a milk shipment that is in danger of becoming too warm may be routed initially to a freezer distribution end to bring the product within tolerance (i.e. by rapidly cooling) before being re-routed to its final destination of a refrigerated distribution end. In another example, in the event of a mismatch between a detected value and an expected value (e.g. a tote weighing less than expected), the routing module may direct the tote to a designated area for further processing.

In one embodiment, the routing module may also rely on data gleaned from an image of the products captured by an image processing device. The routing module 230 can analyze an image and extract a second set of attributes from the image using machine vision and/or video analytics. The types of machine vision and/or video analytics used by the routing module 230 can be but are not limited to: Stitching/Registration, Filtering, Thresholding, Pixel counting, Segmentation, Inpainting, Edge detection, Color Analysis, Blob discovery & manipulation, Neural net processing, Pattern recognition, Barcode Data Matrix and "2D barcode" reading, Optical character recognition and Gauging/Metrology. The second set of attributes may then also be used by the routing module in determining how to route the tote. For example, the computing system 200 may receive a captured image of perishable objects inside a tote from the image capturing device 250, a first set of attributes encoded in electrical signals, associated with the perishable items from the sensors 245, and an identifier associated with the perishable items from the identifier reader 255. The routing module 230 can decode the set of information from the electrical signals. The first set of attributes can be the quantity of the perishable items, weight of the perishable items, the temperature of the perishable items and/or the moisture of the perishable items or other detected current characteristics of the products in the tote. The routing module 230 can query the physical objects database 220 using the identifier to retrieve a set of information associated with the perishable items. The set of information can include, expiration date of the perishable items, the type of perishable items, the name of the perishable items and the conditions in which the perishable items are ideally stored. Furthermore, the routing module 230 can use machine vision and/or video analytics to extract a second set of attributes associated with the perishable items. The set of attributes can include, the color of the perishable items, the size of the perishable items and the shape of the perishable items. Based on the one or more of the: first set of attributes decoded from the sensors; the set of information retrieved from the physical objects database 220 and/or the second set of attributes extracted from the image the routing module 230 can apply pre-determined criteria for the particular product and can control the conveyer belt 260 to route the tote filled with perishable items to a particular distribution end. For example, the routing module 230 can determine the perishable items need to be frozen and is currently frozen and accordingly determine that the tote should be routed to a freezer distribution end. It will be appreciated that various combinations of the first set of attributes, second set of attributes and object information for the physical objects in the tote may be used to determine the routing module's routing determination within the scope of the present invention in addition to those specifically described here.

As a non-limiting example, the automated tote routing system 240 can be implemented in a retail store and products can be disposed at the retail store. A conveyer belt can be disposed in a storage room of a retail store. An array of sensors can be disposed underneath the conveyer belt and an identifier reader and optionally an image capturing device can be disposed with respect to the conveyer belt. Alternatively, the array of sensors can be disposed on a bottom surface of a tote.

A tote filled with products disposed at the retail store can be received by the conveyer belt. A machine-readable element can be disposed on the tote. The machine-readable element can be a barcode, QR code, RFID tag or any element readable by a NFC device. The machine-readable element can be encoded with an identifier associated with the products inside the tote. For example, the products can be all grocery items. Alternatively, the products can be toys. In other embodiments, the products can be a mixture of different types of products.

The identifier reader 255 can read the machine-readable element and decode the identifier. The sensors 245 can detect a first set of attributes associated with the products. For example, the sensors 245 can detect the quantity, temperature, moisture and weight of the products inside the tote. The sensors 245 can encode the first set of attributes in electrical signals. Additionally, an image of the products can be captured by an image capturing device 250. The identifier reader 255 and the sensors 255 can transmit the identifier and the first set of attributes encoded in electrical signals to the computing system 200. If the tote routing system is equipped with an image capturing device, the image capturing device 250 can also transmit the captured image to the computing system 200.

The computing system 200 can receive the identifier and the set of information encoded in the electrical signals (and optionally the image) and execute the routing module 230 in response to receiving the transmitted data. The routing module 230 can decode the first set of attributes from electrical signals. The routing module 230 can query the physical objects database 230 to retrieve a set of information associated with the products inside the tote. Finally, the routing module 230 can optionally extract a second set of attributes from the image using machine vision and/or video analytics. Based on one or more of the: the first set of attributes associated decoded from the electrical signals, the set of information retrieved from the physical objects database and the extracted second set of attributes, the routing module 230 can control the conveyer belt to route the tote filled with products to a particular distribution end. In the example in which the tote is filled with groceries, the routing module 230 can determine the temperature of groceries and/or any moisture dissipating from the groceries from the decoded information from the electrical signals transmitted from the sensors 245. The routing module 230 can determine the tote needs to be in a refrigerated area and accordingly can control the conveyer belt 260 to transport the tote to the chiller distribution end. Alternatively, the routing module 230 can determine from the set of information retrieved from the physical objects database 220 that the tote is filled with toys. Accordingly, the routing module 230 can control the conveyer belt 260 to transport the tote to the ambient (room) temperature distribution end. In another example, the routing module 230 can determine from the set of attributes extracted from the image that there are frozen items in the tote such as ice cream and the tote is currently registering temperatures consistent with frozen food. Accordingly, the routing module 230 can control the conveyer belt to transport the tote to the freezer distribution end.

In some embodiments, the totes can be packaged for delivery. The routing module 230 can query the physical objects database 230 using the identifier from the machine-readable element affixed to the tote to retrieve the date and time the tote is supposed to leave for delivery. The routing module 230 can assign a priority to the tote based on the date and time the tote is supposed to leave for delivery. Accordingly, based on the priority the routing module 230 can control the conveyer belt 260 to transport the tote to an appropriate distribution end. For example, the totes with higher priorities can be placed closer to the delivery vehicles. Moreover, the totes with higher priorities can be placed physically above the totes with lower priorities so that there is easier access to the totes with the higher priorities. Furthermore, the routing module 230 can query the physical objects database 230 using the identifier of the machine-readable element affixed to the tote, to retrieve the address of where the tote is being delivered. The routing module can organize the totes in the distribution ends so that they are loaded into the delivery vehicle in the order they are supposed to be delivered. For example, the first tote to be delivered should be the last tote to be loaded onto the delivery vehicle.

In some embodiments, the routing module 230 can determine that the tote is empty or incorrect products are placed inside the tote based on the first set of attributes decoded from the electrical signals, the image captured from the image capturing device and/or the identifier from the machine readable element affixed to the tote. The routing module 230 can control the conveyer belt 260 to transport the tote to a quality control distribution end in which the employees of the retail store can provide the attention needed to the tote.

Figure 3:
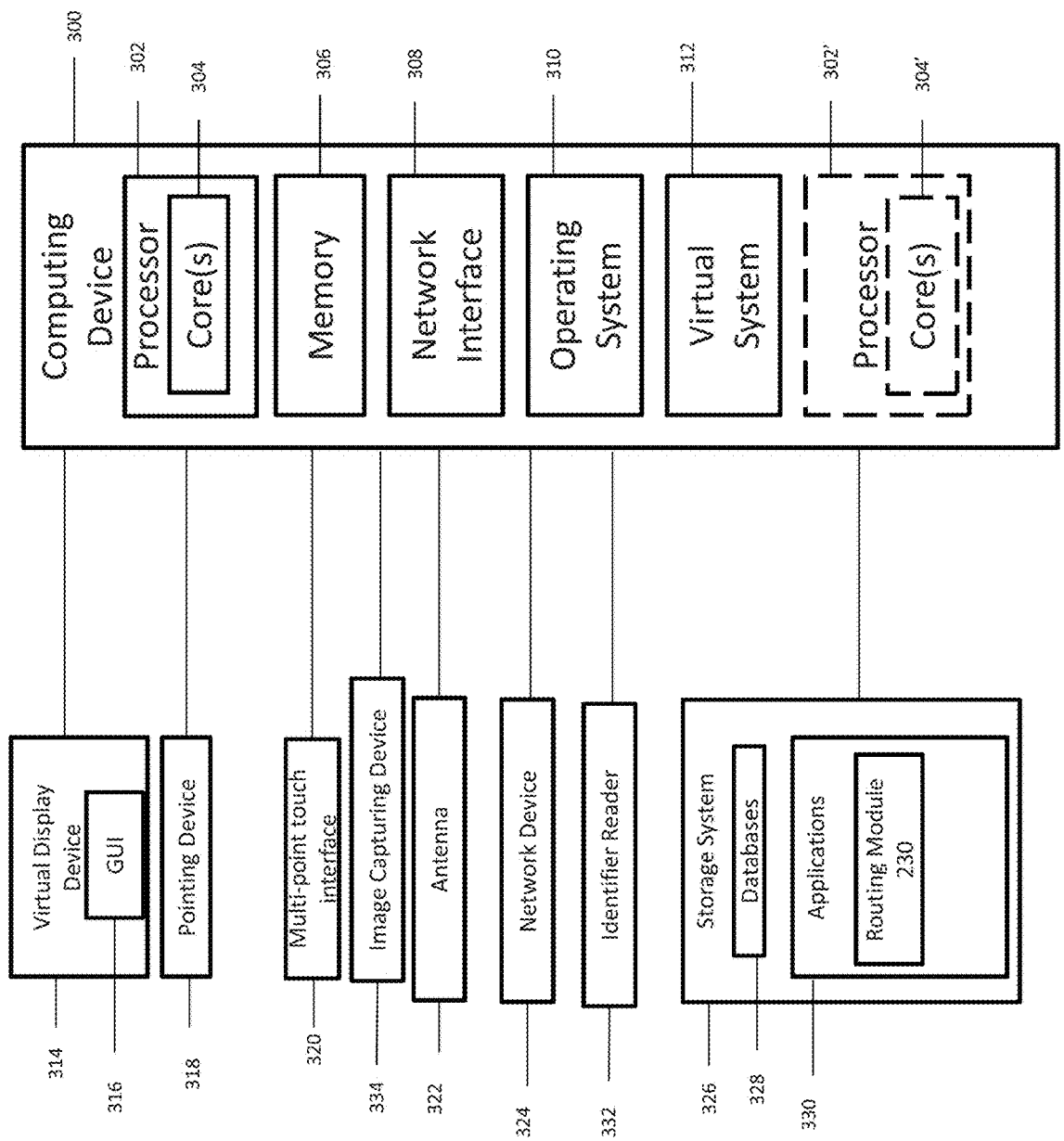
FIG. 3 is a block diagrams illustrating of an exemplary computing device in accordance with an exemplary embodiment.

FIG. 3 is a block diagram of an example computing device for implementing exemplary embodiments of the present disclosure. Embodiments of the computing device 300 can implement embodiments of the routing module. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the routing module 230) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, a pointing device 318, an image capturing device 334 and an identifier reader 332.

The computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information regarding available space in a storage unit and echoes of sounds as well as relationship between the available space in a storage unit and echoes of sounds. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

FIG. 4 is a flowchart illustrating a routing process for the automated tote routing system according to exemplary embodiment. In operation 400, a conveyer belt (e.g. conveyer belt 100, 132, 140,152, 180, 190, 192, 194 and 196 as shown in FIGS. 1A-D) disposed in a facility (e.g. facility 112, 146 as shown in FIGS. 1A-B) can receive a tote (e.g. tote 106, 150 as shown in FIGS. 1A and 1D). Physical objects (e.g. physical objects 118 as shown in FIG. 1A) can be stored within the tote. An array of sensors (e.g. array of sensors 102, 176 as shown in FIGS. 1A and 1D) can be disposed underneath the conveyer belt. Alternatively, the array of sensors can be disposed on the bottom surface of the tote or in another location. A image capturing device (e.g. image capturing device 110 as shown in FIG. 1A) and identifier reader (e.g. identifier reader 104 as shown in FIG. 1A) can be disposed with respect to the conveyer belt. The image capturing device and identifier reader can be disposed in a tunnel and/or tunnel scanner (e.g. tunnel and tunnel scanner 108, 142, 144, 148 as shown in FIGS. 1A-D) disposed above the conveyer belt.

In operation 402, the array of sensors can detect a first set of attributes associated with the physical objects stored within the tote. The array of sensors can encode the first set of attributes in electrical signals. The first set of attributes can include but are not limited to: weight, pressure, temperature, and/or moisture of the physical objects. The array of sensors can be made of piezoelectric material. The identifier reader can read and decode an identifier encoded in a machine-readable element (e.g. machine readable element 116 as shown in FIG. 1A). The identifier can be associated with the physical objects within the tote. The machine-readable element can be a barcode, QR code, RFID tag, or any other machine-readable element detectable by NFC. Optionally, an image capturing device can capture an image of the physical objects stored in the tote. In operation 404, the array of sensors and the identifier reader (and optionally the image capturing device) can transmit the electrical signals, the image and the identifier to a computing system.

In operation 406, the computing system can execute the routing module (e.g. routing module 230 as shown in FIG. 2) in response to receiving the electrical signals and the identifier and optionally the image. The routing module can decode the first set of attributes from the electrical signals. In operation 408, the routing module can query the physical objects database (e.g. physical objects database 220 as shown in FIG. 2) using the identifier, to retrieve a set of information associated with the physical objects stored in the tote. Optionally in operation 410, the routing module can use machine vision and/or video analytics to extract a second set of attributes of the physical objects inside the tote.

In operation 412, based on the first set of attributes and/or the set of information (and optionally the second set of attribute the routing module can determine the contents stored inside the tote. In operation 414, the routing module can determine the delivery status of the tote based on the first set of attributes and/or the set of information (and optionally the second set of attributes). The routing module can determine the date and time the tote is supposed to leave for delivery and the location the to which the tote is supposed to be delivered. In operation 416, based on the, the delivery status the routing module can assign a priority to the tote.

In operation 418, the routing module can automatically trigger the conveyer belt to route the tote to a selected distribution end (e.g. freezer, chiller and ambient distribution ends 130,128,126, 154,156, and 158 as shown in FIGS. 1B-D) based on the first set of attributes and/or the set of information (and optionally the second set of attributes). The routing module can further route the tote to a particular distribution end based on the assigned priority.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An autonomous routing system comprising:
   a conveyer belt including a plurality of distribution ends, the conveyor belt configured to receive a first tote storing a plurality of physical objects on the conveyor belt and transport the first tote to one of the distribution ends, at least two of the plurality of distribution ends associated with different temperature areas;
   one or more sensors configured to detect a first set of attributes associated with the plurality of physical objects stored in the first tote, the first set of attributes including a temperature attribute;
   an identifier reader disposed with respect to the conveyer belt and configured to read a machine-readable element associated with the plurality of physical objects stored in the first tote and decode the machine-readable element to extract the identifier;
   a computing system including a server and a database operatively coupled to the one or more sensors and the identifier reader, the computing system configured to execute a routing module that when executed:
      queries the database using the identifier extracted from the machine-readable element by the identifier reader to retrieve information associated with the plurality of physical objects stored in the first tote;
      determines a mismatch between the temperature attribute and the information associated with the plurality of physical objects stored in the first tote; and
      automatically triggers the conveyer belt to route the first tote to a selected one of the plurality of distribution ends based on the determination of the mismatch.

2. The system in claim 1, further comprising:
   an image capturing device operatively coupled to the computing system and disposed with respect to the conveyer belt, the image capturing device configured to capture an image of the plurality of physical objects stored in the first tote, wherein the computing system is further programmed to extract a second set of attributes associated with the physical object from the image of the plurality of physical objects stored in the first tote.

3. The system in claim 2, wherein the routing module when executed triggers the conveyer belt to route of the first tote based in part on the second set of attributes.

4. The system of claim 1, wherein the one or more sensors include piezoelectric sensors.

5. The system of claim 1, wherein the first set of attributes associated with the plurality of physical objects stored in the first tote is one or more of: weight, pressure, temperature, and moisture attributes.

6. The system of claim 1, wherein the retrieved information associated with the plurality of physical objects stored in the first tote is one or more of: names of the physical objects, types of the physical objects, stored weight of the physical objects, or stored dimensions of the physical objects.

7. The system of claim 1, wherein the second set of attributes associated with the plurality of physical objects stored in the first tote is one or more of: estimated dimensions of the physical objects or a condition of the physical objects.

8. The system of claim 1, wherein the plurality of physical objects stored in the first tote are temperature controlled.

9. The system of claim 1, wherein at least two of the plurality of distribution ends are connected to a refrigerated area, a freezing temperature area, an ambient temperature area and a quality control area.

10. The system of claim 1 wherein a second tote is received by the conveyer belt.

11. The system of claim 10, wherein:
   the one or more sensors are configured to detect a first set of attributes associated with the plurality of physical objects stored in the second tote in response to the second tote passing over the at least one of the one or more sensors;
   the identifier reader is configured to read a machine-readable element associated with the plurality of physical objects stored in the second tote and decode the machine-readable element to extract an identifier; and
   wherein the routing module when executed:
      queries the database using the identifier extracted from the machine-readable element by the identifier reader to retrieve information associated with the plurality of physical objects stored in the second tote.

12. The system in claim 11, wherein the routing module when executed:
   assigns a priority to the first tote with respect to the second tote based on an analysis of the retrieved information and first set of attributes associated with the plurality of physical objects stored in the first and second tote.

13. An autonomous routing method comprising:
   receiving, on a conveyer belt that includes a plurality of distribution ends, a first tote storing a plurality of physical objects;
   transporting, via the conveyer belt, the first tote to one of the plurality of distribution ends, at least two of the plurality of distribution ends associated with different temperature areas;
   detecting, via one or more sensors, a first set of attributes associated with the plurality of physical objects stored in the first tote, the first set of attributes including a temperature attribute;

reading, via an identifier reader disposed with respect to the conveyer belt, a machine-readable element associated with the plurality of physical objects stored in the first tote;

decoding, via the identifier reader, a identifier encoded in the machine-readable element;

querying, via a computing system including a server and a database operatively coupled to the one or more sensors and the identifier reader, the database using the identifier extracted from the machine-readable element by the identifier reader to retrieve information associated with the plurality of physical objects stored in the first tote;

determining a mismatch between the temperature attribute and the information associated with the plurality of physical objects stored in the first tote; and automatically triggering, via the computing system, the conveyer belt to route the first tote to a selected one of the plurality of distribution ends based on the determined mismatch.

14. The method in claim 13, further comprising:

capturing, via an image capturing device operatively coupled with the computing system and disposed with respect to the conveyer belt, an image of the plurality of physical objects stored in the first tote; and extracting, via the computing system, a second set of attributes associated with the physical object from the image of the plurality of physical objects stored in the first tote.

15. The method in claim 14 wherein, triggering the conveyer belt to route the first tote is also based in part of second set of attributes.

16. The system of claim 15, wherein the one or more sensors include piezoelectric sensors.

17. The method of claim 13, wherein the first set of attributes associated with the plurality of physical objects stored in the first tote is one or more of: weight, pressure, temperature, and moisture attributes.

18. The method of claim 13, wherein the plurality of physical objects stored in the first tote are temperature controlled.

19. The method of claim 13, wherein at least two of the plurality of distribution ends are connected to a refrigerated area, a freezing temperature area, an ambient temperature area and a quality control area.

20. The method of claim 13, further comprising:

receiving, on the conveyer belt, a second tote is received by the conveyer belt;

detecting, via the one or more sensors are, a first set of attributes associated with the plurality of physical objects stored in the second tote in response to the second tote passing over the at least one of the one or more sensors;

reading, via the identifier reader, a machine-readable element associated with the plurality of physical objects stored in the second tote and decode the machine-readable element to extract an identifier;

querying, via the routing module, the database using the identifier extracted from the machine-readable element by the identifier reader to retrieve information associated with the plurality of physical objects stored in the second tote; and assigning, via the routing module, a priority to the first tote with respect to the second tote based on an analysis of the retrieved information and first set of attributes associated with the plurality of physical objects stored in the first and second tote.

* * * * *